(12) United States Patent
Endo et al.

(10) Patent No.: US 10,468,922 B2
(45) Date of Patent: Nov. 5, 2019

(54) ELECTRIC MOTOR

(71) Applicant: AISIN SEIKI KABUSHIKI KAISHA, Kariya-shi (JP)

(72) Inventors: Hiroki Endo, Anjo (JP); Hiroyuki Kawada, Anjo (JP); Hiroto Ogawa, Takahama (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 111 days.

(21) Appl. No.: 15/666,926

(22) Filed: Aug. 2, 2017

(65) Prior Publication Data

US 2018/0048194 A1 Feb. 15, 2018

(30) Foreign Application Priority Data

Aug. 9, 2016 (JP) .................................. 2016-156466

(51) Int. Cl.
  *H02K 1/14* (2006.01)
  *H02K 1/18* (2006.01)
  *H02K 1/27* (2006.01)
  *H02K 15/02* (2006.01)

(52) U.S. Cl.
  CPC ............ *H02K 1/148* (2013.01); *H02K 1/185* (2013.01); *H02K 1/276* (2013.01); *H02K 1/2706* (2013.01); *H02K 15/022* (2013.01)

(58) Field of Classification Search
  CPC ................................. H02K 1/148; H02K 1/185
  See application file for complete search history.

(56) References Cited

U.S. PATENT DOCUMENTS

| 5,583,387 | A | * | 12/1996 | Takeuchi | ................ | H02K 1/16 |
|---|---|---|---|---|---|---|
| | | | | | | 174/DIG. 20 |
| 7,667,367 | B2 | * | 2/2010 | Matsuo | ................ | H02K 1/148 |
| | | | | | | 310/216.008 |
| 7,761,975 | B2 | * | 7/2010 | Rau | .......................... | H02K 1/16 |
| | | | | | | 29/596 |
| 9,438,075 | B2 | * | 9/2016 | Li | .......................... | H02K 1/148 |
| 2005/0189844 | A1 | * | 9/2005 | Du | .......................... | H02K 1/148 |
| | | | | | | 310/433 |
| 2013/0026878 | A1 | * | 1/2013 | Feuerrohr | ............. | H02K 1/148 |
| | | | | | | 310/216.136 |

FOREIGN PATENT DOCUMENTS

| JP | 2002-95192 | 3/2002 |
|---|---|---|
| JP | 2004-328818 | 11/2004 |
| JP | 2006-223076 | 8/2006 |
| JP | 2009-44797 | 2/2009 |
| JP | 2012-257433 | 12/2012 |
| JP | 2015-65741 | 4/2015 |

* cited by examiner

*Primary Examiner* — Dang D Le
(74) *Attorney, Agent, or Firm* — Oblon, McClelland, Maier & Neustadt, L.L.P.

(57) ABSTRACT

An electric motor includes: a rotor that has a rotation axis; and a stator that includes an annular yoke portion having the rotation axis as a center, and a plurality of teeth portions which protrude in a radial direction from the yoke portion, in which the stator is configured with split stators including a plurality of split yoke portions which are split in a circumferential direction, and each of the split stators includes an abutting portion on which the adjacent split yoke portions abut each other, on a side close to the rotor, and a welding portion on which the adjacent split yoke portions are welded in a state of being separated from each other, on a side further distant from the rotor than the abutting portion.

7 Claims, 5 Drawing Sheets

ELECTRIC MOTOR

CROSS REFERENCE TO RELATED APPLICATIONS

This application is based on and claims priority under 35 U.S.C. § 119 to Japanese Patent Application 2016-156466, filed on Aug. 9, 2016, the entire contents of which are incorporated herein by reference.

TECHNICAL FIELD

This disclosure relates to an electric motor including a rotor and a stator which is configured by split stators.

BACKGROUND DISCUSSION

In the related art, known is an electric motor in which a stator disposed in a region surrounding a rotor is configured by split stators split in a circumferential direction (for example, see JP 2002-95192A (Reference 1) and JP 2015-65741A (Reference 2)). In this manner, if the stator is configured by the split stators, a coil is likely to be wound around the stator in an aligned manner, densification of winding is achieved, and the electric motor becomes compact.

A split stator of Reference 1 includes a split yoke portion, and a teeth portion that protrudes toward an inside in a radial direction from the split yoke portion, in which a projection portion and a recess portion are formed on end surfaces of the adjacent split yoke portions. In a state where the projection portion and the recess portion are fit, an outer circumferential side of a fitting portion of the adjacent split yoke portions is bonded by a laser welding. Reference 1 discloses that shapes of bonding surfaces between the recess portion and the projection portion are different from each other on an outside and an inside, thereby, reducing clattering and reducing a deformation amount due to thermal contraction.

A split stator of Reference 2 includes a split yoke portion, and a teeth portion that protrudes toward the inside in the radial direction from the split yoke portion, in which a projection portion and a recess portion are formed on the end surfaces of the adjacent split yoke portions. In a state where the projection portion and the recess portion are fit, and each of the split stators is pressed on the inside in the radial direction by using a ring-shaped jig which is capable of expanding and contracting in the radial direction, the split stator is electrified, and diffusion bonding is performed.

However, since the electric motor of the related art is formed by bonding by the laser welding or the diffusion bonding in a state where the projection portion and the recess portion are fit on the end surfaces of the adjacent split yoke portions, a distortion due to thermal stress easily becomes ununiform between the projection portion and the recess portion. As a result, a circularity of an inner circumferential surface of the stator is lowered, an interval between the stator and the rotor becomes ununiform in the circumferential direction, and degradation of motor performance is caused. In particular, as Reference 1, in a case where the outer circumferential side of the bonding portion of the split yoke portions is bonded by the laser welding, the circularity of the inner circumferential surface of the stator is likely to be lowered since heating is locally performed.

In a case where the diffusion bonding is performed as Reference 2, since the entire stator is heated, power consumption becomes large, and there is a need to adjust a temperature condition or electrification time in order to bond the split yoke portions, and it is complicated. Furthermore, an electrical current may concentrate on the projection portion, and the distortion due to the thermal stress may become too large.

Thus, a need exists for an electric motor which is not susceptible to the drawback mentioned above.

SUMMARY

A feature of an electric motor according to an aspect of this disclosure resides in that the electric motor includes a rotor that has a rotation axis, and a stator that includes an annular yoke portion having the rotation axis as a center, and a plurality of teeth portions which protrude in a radial direction from the yoke portion, in which the stator is configured with split stators including a plurality of split yoke portions which are split in a circumferential direction, and each of the split stators includes an abutting portion on which the adjacent split yoke portions abut each other, on a side close to the rotor, and a welding portion on which the adjacent split yoke portions are welded in a state of being separated from each other, on a side further distant from the rotor than the abutting portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an electric motor according to embodiments will be described based on the drawings. As an example of the embodiments, an electric motor M that is used in a water pump P for a vehicle through which cooling water is circulated will be described. However, this disclosure is not limited to the following embodiments, and may be variously modified within the scope without departing from the gist thereof.

Figure 1:
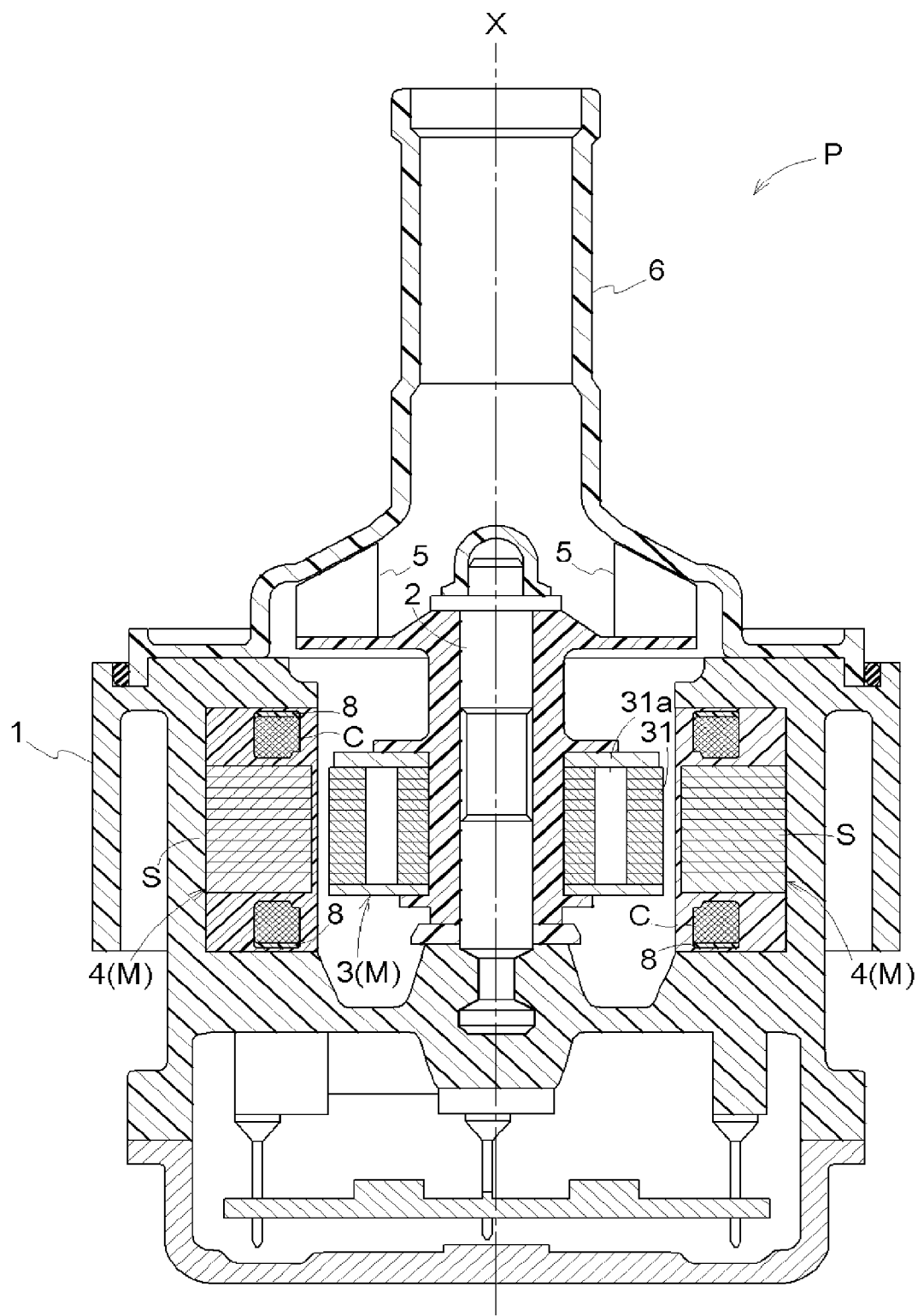
FIG. 1 is a sectional view of a water pump.

As illustrated in FIG. 1, the water pump P includes a casing 1 that is made of a resin, a support shaft 2 that is fixed to the casing 1, a cylinder-shaped rotor 3 that is freely rotatable in a state of being externally fitted in the support shaft 2, a cylinder-shaped stator 4 that is disposed on an outside (region surrounding an outer circumference of the rotor 3) of the rotor 3, and an impeller 5 that is fixed to one end of the support shaft 2. For example, the water pump P that circulates the cooling water in an inverter, or circulates the cooling water between an engine and a radiator is configured, by accommodating the impeller 5 in a pump housing 6.

The electric motor M that is used in the water pump P is configured by a three-phase brushless motor including the rotor 3 that rotates around a rotation axis X of the support shaft 2, and the annular stator 4 that generates a rotating magnetic field with respect to the rotor 3. The electric motor M may also function as a power generator by causing the rotor 3 to rotate.

The rotor 3 includes an annular rotor core 31 that is formed by stacking a plurality of magnetic steel plates, and a plurality of permanent magnets 31a that are embedded in the rotor core 31. The rotor core 31 and the permanent magnet 31a are insert-molded with the resin, and are integrated with each other. The permanent magnet 31a is configured by six poles, and is an electric motor M having six poles, three phases, and nine slots (see FIG. 2) is provided. The permanent magnet 31a is not limited to six poles, and may be configured by even-numbered poles of two poles or more.

Figure 2:
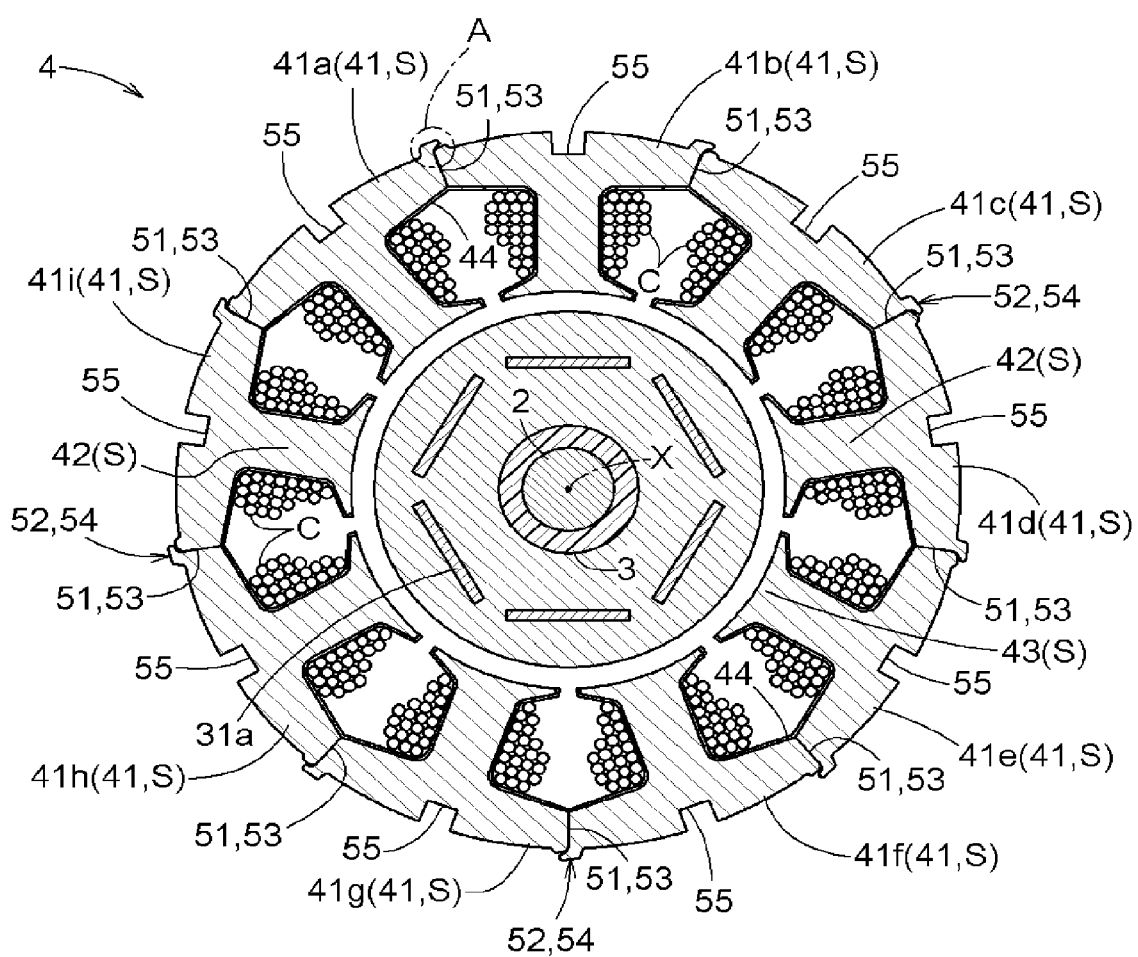
FIG. 2 is a sectional view of a stator.

As illustrated in FIG. 2, the stator 4 includes a plurality (nine in the embodiment) of split stators S that are split in a circumferential direction, an insulator 44 that covers the split stator S and is made of the resin, and a coil C that is wound around an outer surface of the insulator 44.

The stator 4 includes a yoke portion 41 that is formed into an annular shape by using the rotation axis X as a center, a plurality (nine in the embodiment) of teeth portions 42 that protrude toward an inside in a radial direction from the yoke portion 41, and a flange portion 43 that is disposed in an arc shape by using the rotation axis X as a center at each protruding end of the plurality of the teeth portions 42. In the embodiment, one teeth portion 42 is disposed so as to correspond to one split stator S.

In the stator 4, the coil C is wound around the teeth portion 42, in a state where the insulator 44 made of the resin is externally fitted in the split stator S. The stator 4 in the state where the coil C is wound is insert-molded with the resin. The insulator 44 is provided for insulation between the split stator S and the coil C, and covers at least an outer surface of the teeth portion 42, and inner surfaces of the yoke portion 41 and the flange portion 43. A strand of the coil C is configured by coating a surface of a copper wire of which a cross section is a circular shape with a resin such as polyurethane. In a case where the insulation between the split stator S and the coil C is appropriately achieved, the coil C may be directly wound around the teeth portion 42.

The split stator S is configured by stacking the magnetic steel plates, and the stator 4 is formed by combining the plurality of split stators S into the annular shape. The plurality of teeth portions 42 extend in a radial fashion having the rotation axis X as a center (on the inside in the radial direction) from split yoke portions 41a to 41i which are formed in each of the split stators S, and are formed in nine spots at regular intervals along the circumferential direction. That is, the plurality of split yoke portions 41a to 41i individually include the teeth portions 42. Two or more teeth portions 42 may be disposed in one of the split yoke portions 41a to 41i, or one teeth portion 42 may be disposed in two or more of the split yoke portions 41a to 41i, and it is not particularly limited.

Figure 3:
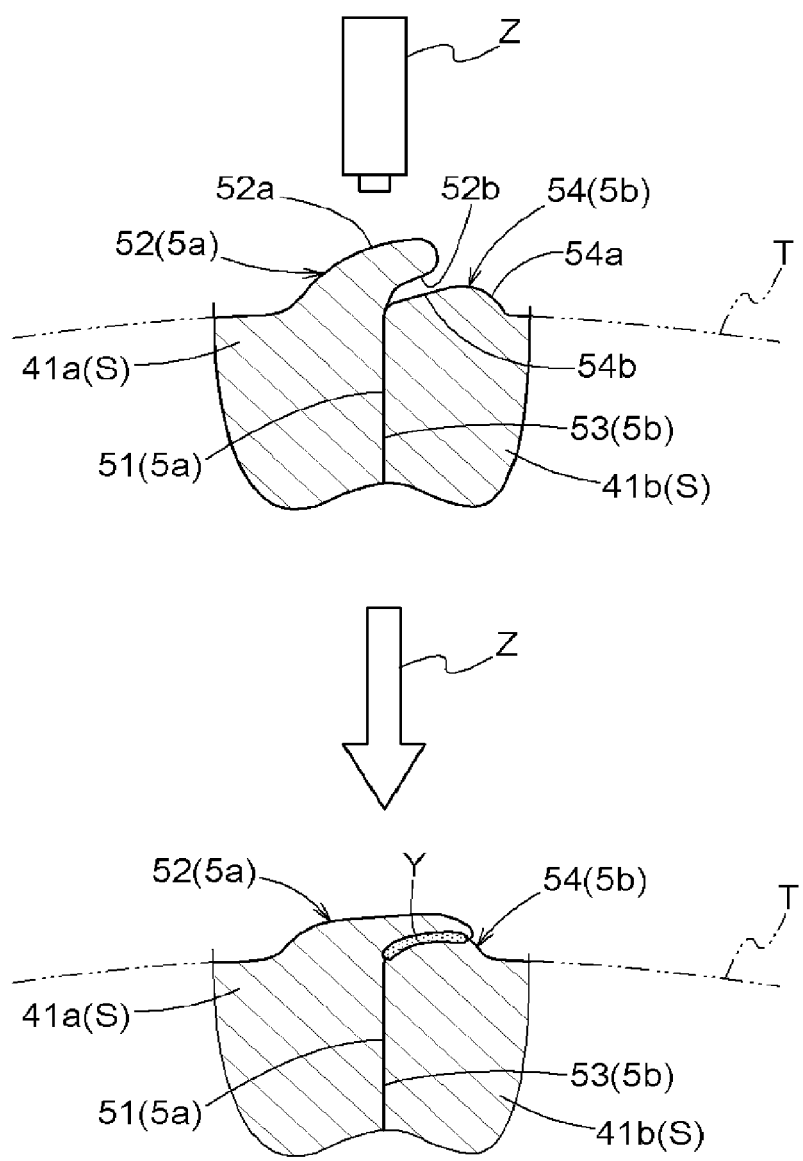
FIG. 3 is an enlarged view of A part of FIG. 2.

As illustrated in FIG. 3 which is obtained by enlarging A part of FIG. 2, on end surfaces 5a and 5b which are parallel to the radial direction of the split yoke portions 41a and 41b, abutting portions 51 and 53 on which the adjacent split yoke portions 41a and 41b abut, and welding portions 52 and 54 on which the adjacent split yoke portions 41a and 41b are welded in a state of being separated from each other are provided. In the same manner, the abutting portions 51 and 53, and the welding portions 52 and 54 are also formed on the end surfaces of all the split yoke portions 41a to 41i in the circumferential direction. Hereinafter, the end surfaces 5a and 5b of a first split yoke portion 41a and a second split yoke portion 41b will be described as a representative example.

In the first split yoke portion 41a, a first abutting portion 51 is formed into a straight line shape in a region of the inside (side close to the rotor 3) in the radial direction of the end surface 5a, and a first welding portion 52 (an example of a first protruding portion) protrudes toward a region of the outside (side distant from the rotor 3) in the radial direction with respect to a virtual annular surface T having the rotation axis X of the yoke portion 41 as a center. The first welding portion 52 is configured by an outer surface 52a of an arc shape, and an inner surface 52b of a straight line shape.

In the second split yoke portion 41b, a second abutting portion 53 is formed into a straight line in a region of the inside (side close to the rotor 3) in the radial direction of the end surface 5b, and the entire second abutting portion 53 abuts at a gradient which is equal to that of the first abutting portion 51 of the first split yoke portion 41a. A second welding portion 54 (an example of a second protruding portion) protrudes toward a region of the outside (side distant from the rotor 3) in the radial direction with respect to the virtual annular surface T having the rotation axis X of the yoke portion 41 as a center, and is configured by a first portion 54a of which an outer surface is an arc shape, and a second portion 54b of which an outer surface is a straight line shape. The end surface which is opposite to the end surface 5a of the first split yoke portion 41a is configured in the same manner as the end surface 5b of the second split yoke portion 41b, and the end surface which is opposite to the end surface 5b of the second split yoke portion 41b is configured in the same manner as the end surface 5a of the first split yoke portion 41a.

The first welding portion 52 and the second welding portion 54 are disposed to face each other, and the straight line-shaped inner surface 52b of the first welding portion 52 and the straight line-shaped second portion 54b of the second welding portion 54 are separated from each other before the inner surface 52b and the second portion 54b are welded (see the upper diagram of FIG. 3). Meanwhile, by performing the welding along the direction of the rotation axis X, the first welding portion 52 and the second welding portion 54 are melted, and a molten material Y appears in an interval between the straight line-shaped inner surface 52b of the first welding portion 52 and the straight line-shaped second portion 54b of the second welding portion 54 (see the lower diagram of FIG. 3). Thereby, the first split yoke portion 41a and the second split yoke portion 41b which are adjacent to each other are tightly fixed. The first abutting portion 51 of the first split yoke portion 41a and the second abutting portion 53 of the second split yoke portion 41b are merely abut on each other, and are not welded.

Figure 4:
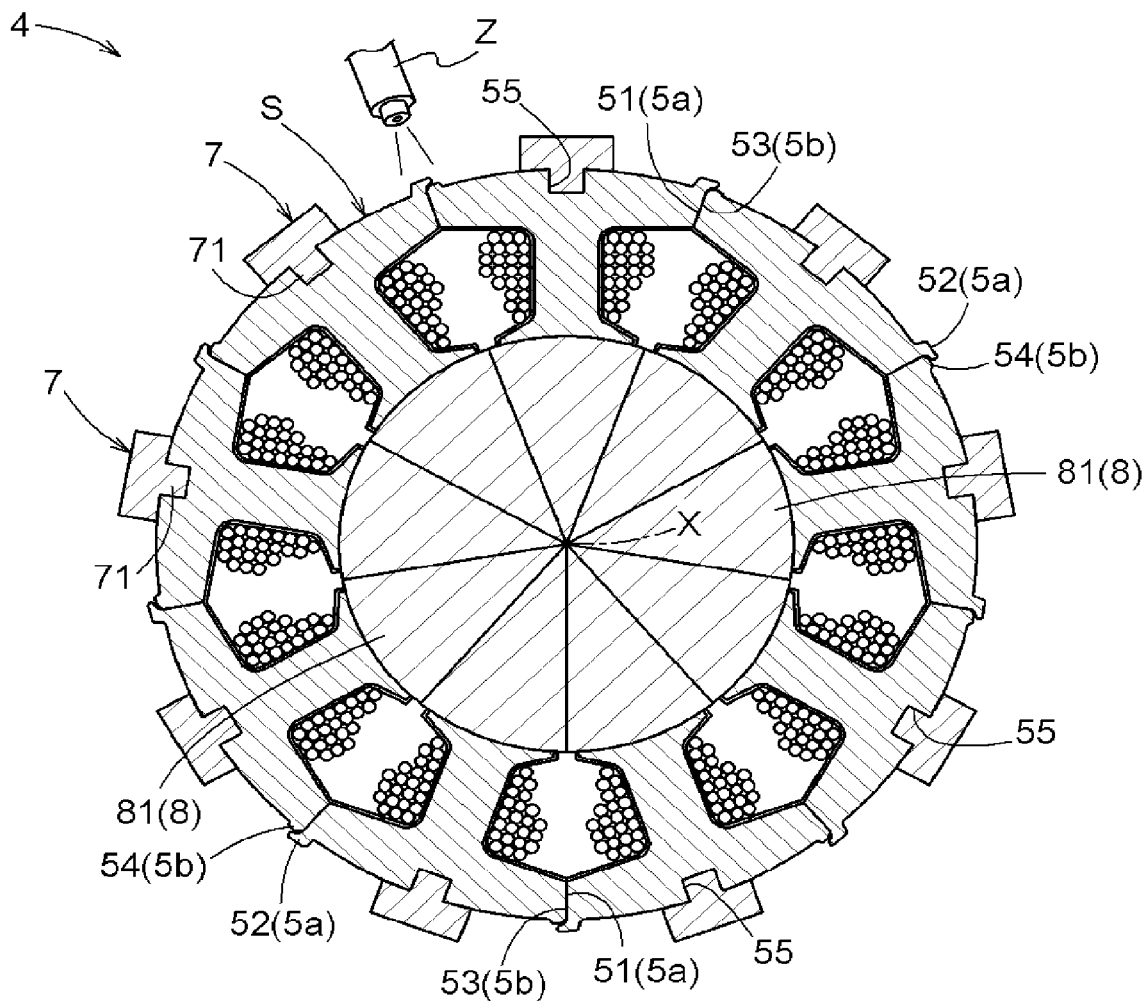
FIG. 4 is a diagram illustrating a case of welding the stator.

As illustrated in FIG. 2 and FIG. 4, in each of the split yoke portions 41a to 41i, a groove portion 55 which is hollowed toward the inside (rotor 3 side) in the radial direction is formed at a central region along the circumferential direction. The groove portion 55 is configured to be capable of engaging protrusions 71 of a first pressing jig 7 (an example of a pressing member) that presses the stator 4 against the inside (rotor 3 side) in the radial direction. A second pressing jig 8 of a column shape that presses the flange portion 43 of the stator 4 against the outside in the radial direction, is disposed on the inside of the stator 4. For example, the second pressing jig 8 is an aggregate of a fan-shaped member 81 which is split into nine, and is configured so that each fan-shaped member 81 can move on the outside in the radial direction. The groove portion 55 may be omitted, and the end surface of the first pressing jig 7 may be formed into an arc shape along the outer surfaces of the split yoke portions 41a to 41i.

Subsequently, a method for fixing the split stator S into an annular shape will be described.

First, as illustrated in FIG. 4, in the plurality of split stators S in which the coil C is wound around the teeth portion 42, all of the split stators S are arrayed into an annular shape between the first pressing jig 7 and the second pressing jig 8 so that the abutting portions 51 and 53 of the split yoke portions 41a and 41b abut on each other. At this time, the split stators S may be arrayed while clamping the welding portions 52 and 54, by using a gripping jig which is not illustrated in the drawing.

Next, the split stator S is pressed against the inside in the radial direction by the first pressing jig 7, and the split stator S is pressed against the outside in the radial direction by the second pressing jig 8. Thereby, the abutting states of the respective abutting portions 51 and 53 of the split yoke portions 41a and 41b are favorably maintained. In this state, the straight line-shaped inner surface 52b of the first welding portion 52 and the straight line-shaped second portion 54b of the second welding portion 54 are separated from each other (see the upper diagram of FIG. 3). Next, by using a welding jig Z, a laser welding of the first welding portion 52 and the second welding portion 54 is performed along the rotation axis X direction. As a result, the straight line-shaped inner surface 52b of the first welding portion 52 and the straight line-shaped second portion 54b of the second welding portion 54 are melted, thereby, the interval disappears, and the split yoke portions 41a and 41b are fixed (see the lower diagram of FIG. 3). The welding of the welding portions 52 and 54 is not limited to the laser welding, but may be an arc welding, a spot welding or the like.

In the same manner, the adjacent split yoke portions of all split yoke portions 41a to 41i are welded, and the stator 4 which is connected into an annular shape is formed. Thereafter, the stator 4 is insert-molded.

In the embodiment, as the welding portions 52 and 54 in which the laser welding is performed, the adjacent split yoke portions are configured to be separated from each other, and the abutting portions 51 and 53 on which the adjacent split yoke portions abut are formed, on the side closer to the rotor 3 than the welding portions 52 and 54. Therefore, a distortion due to welding heat is received by the welding portions 52 and 54, and the welding heat is prevented from being transmitted up to the abutting portions 51 and 53. As a result, since the abutting portions 51 and 53 which are formed on the rotor 3 side are less likely to be distorted by thermal stress, and circularity of an inner circumferential surface of the stator 4 which faces the rotor 3 is secured, it is possible to exhibit a desired motor performance.

The molten material Y which is generated by heating the welding portions 52 and 54 appears in the interval between the straight line-shaped inner surface 52b of the first welding portion 52 and the straight line-shaped second portion 54b of the second welding portion 54, thereby, the adjacent split yoke portions are tightly fixed. As a result, by the welding portions 52 and 54 and the abutting portions 51 and 53 which are tightly fixed, the split yoke portions 41a to 41i are not moved relatively with each other, and it is possible to maintain the circularity of the inner circumferential surface of the stator 4, even when the split yoke portion is insert-molded with the resin. Since the second welding portion 54 is provided with the first portion 54a of which the outer surface is the arc shape, a welding volume becomes large, a large amount of the molten material Y may be secured, and the adjacent split yoke portions are more tightly fixed.

If the welding portions 52 and 54 are positioned on the outside in the radial direction of the yoke portion 41 as the embodiment, since the welding jig Z is easy to be disposed so as not to interfere with the stator 4, it is possible to enhance working efficiency.

As the embodiment, if the welding portions 52 and 54 are configured to protrude toward the outside in the radial direction of the yoke portion 41, a flow of a magnetic flux flowing in the circumferential direction of the yoke portion 41 is not hindered by the welding portions 52 and 54. That is, since the magnetic flux smoothly flows to the abutting portions 51 and 53 of the adjacent split yoke portions, it is possible to further enhance the motor performance.

In the embodiment, since the split yoke portions 41a to 41i are welded in a state where the stator 4 is pressed and retained by the first pressing jig 7 and the second pressing jig 8, position shift of the split yoke portions 41a to 41i is not performed in a direction of being separated from the rotor 3 at the time of the welding. At this time, if the groove portions 55 that engage the protrusions 71 of the first pressing jig 7 are disposed at the center in the circumferential direction of the split yoke portions 41a to 41i as the embodiment, since the split yoke portions 41a to 41i are supported in a well-balanced manner, and it is possible to operate the welding jig Z without interfering with the first pressing jig 7, the working efficiency is enhanced. Accordingly, it is possible to reliably secure the circularity of the stator 4 which faces the rotor 3, with a simple configuration.

Another Embodiment

Since a basic configuration is the same as that of the embodiment described above, only different configurations will be described using the drawings. In order to make the understanding of the drawings easy, the description will be carried out by using member names and signs which are the same as those of the embodiment described above.

Figure 5:
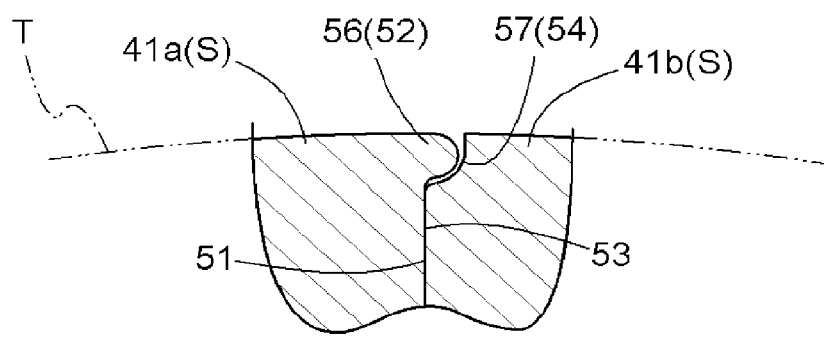
FIG. 5 is an enlarged view of a welding portion according to Another Embodiment 1.

As illustrated in FIG. 5, the first welding portion 52 of the first split yoke portion 41a may be configured by a curved projection portion 56 which protrudes into a curved shape toward the second split yoke portion 41b, and the second welding portion 54 of the second split yoke portion 41b may be configured by a curved recess portion 57 which faces the curved projection portion 56, and is hollowed into a curved shape. In the embodiment, the welding portions 52 and 54 do not protrude toward the region of the outside in the radial direction with respect to the virtual annular surface T, and the curved projection portion 56 and the curved recess portion 57 are separated from each other in the circumferential direction.

If the welding portions 52 and 54 are configured into the curved shapes in this manner, since it is possible to sufficiently secure a flow path length of the molten material Y by the welding, eliminated are damages that the molten material Y flows to the abutting portions 51 and 53, and the distortion due to thermal stress occurs. Accordingly, the abutting portions 51 and 53 are less likely to be influenced by the thermal stress, and it is possible to reliably secure the circularity of the stator 4 which faces the rotor 3. Since the welding portions 52 and 54 do not protrude toward the outside, it is possible to configure the stator 4 to be compact.

Figure 6:
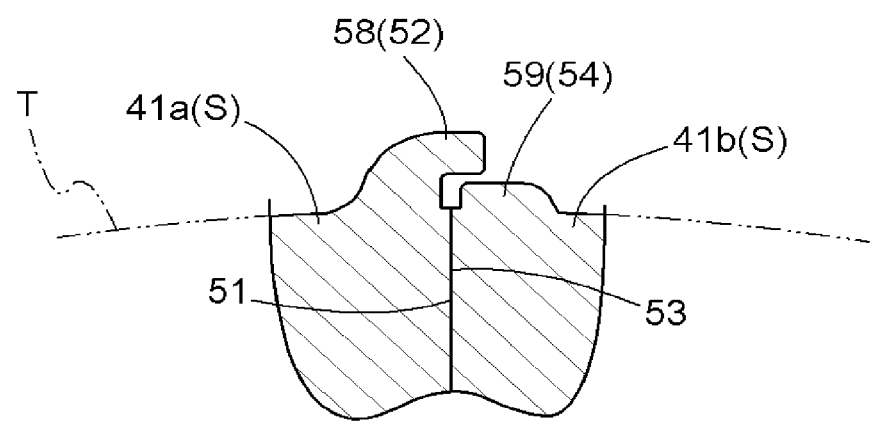
FIG. 6 is an enlarged view of a welding portion according to Another Embodiment 2.

As illustrated in FIG. 6, the first welding portion 52 of the first split yoke portion 41a may be configured by a bent portion 58 that is bent into an L shape in a state of protruding toward the region of the outside in the radial direction with respect to the virtual annular surface T, and the second welding portion 54 of the second split yoke portion 41*b* may be configured by a rectangular portion 59 that protrudes into a rectangular shape or a trapezoidal shape toward the region of the outside in the radial direction with respect to the virtual annular surface T. Even in this case, since it is possible to sufficiently secure the flow path length of the molten material Y by the welding, eliminated are damages that the molten material Y flows to the abutting portions 51 and 53, and the distortion due to thermal stress occurs.

Other Embodiments (1) In the embodiments described above, the abutting portions 51 and 53 and the welding portions 52 and 54 may be appropriately modified within the scope without departing from the gist. For example, the abutting portions 51 and 53 are not formed into straight line shapes, and may be formed into curved line shapes. The welding portions 52 and 54 may be formed by appropriately combining the configurations illustrated in FIG. 3 to FIG. 6, and may be formed into any shape as long as the welding portions 52 and 54 are separated from each other. For example, the welding portions 52 and 54 in the embodiment of FIG. 5 may protrude toward the region of the outside in the radial direction with respect to the virtual annular surface T, or the welding portions 52 and 54 in the embodiment of FIG. 5 may be formed into straight line shapes.

(2) The electric motor M in the embodiments described above may be an inner rotor type in which the rotor 3 is disposed on the inside of the stator 4, or an outer rotor type in which the rotor 3 is disposed on the outside in the radial direction of the stator 4. In a case of the outer rotor type, the stator 4 includes the annular yoke portion 41 having the rotation axis X as a center, and the plurality of teeth portions 42 which protrude toward the outside in the radial direction from the yoke portion 41. In the electric motor M of the outer rotor type, the abutting portions 51 and 53 on which the adjacent split yoke portions abut are disposed on the outside (rotor 3 side) in the radial direction, and the welding portions 52 and 54 on which the adjacent split yoke portions are welded in a state of being separated from each other are disposed on the inside (side which is opposite to the rotor 3) in the radial direction. Even in this case, it is possible to expect the effects described above.

(3) A device using the electric motor M in the embodiments described above is not limited to the water pump P that circulates the cooling water of the engine, but may be a pump that circulates engine oil, or may be a device which is used for other purposes in addition to the vehicle. A method for driving the electric motor M is not limited to the three-phase brushless motor that generates an alternating magnetic field, and a motor with a brush may be used.

This disclosure may be applied to the electric motor which is used in various devices such as the water pump for the vehicle.

A feature of an electric motor according to an aspect of this disclosure resides in that the electric motor includes a rotor that has a rotation axis, and a stator that includes an annular yoke portion having the rotation axis as a center, and a plurality of teeth portions which protrude in a radial direction from the yoke portion, in which the stator is configured with split stators including a plurality of split yoke portions which are split in a circumferential direction, and each of the split stators includes an abutting portion on which the adjacent split yoke portions abut each other, on a side close to the rotor, and a welding portion on which the adjacent split yoke portions are welded in a state of being separated from each other, on a side further distant from the rotor than the abutting portion.

In this configuration, for example, as a welding portion by a laser welding, the adjacent split yoke portions are configured to be separated from each other, and the abutting portion on which the adjacent split yoke portions abut is formed on the side closer to the rotor than the welding portion. Therefore, a distortion due to welding heat is received by the welding portion, and the welding heat is prevented from being transmitted up to the abutting portion. As a result, since the abutting portion which is formed on the side close to the rotor is less likely to be distorted by thermal stress, and the circularity of the stator which faces the rotor is secured, it is possible to exhibit a desired motor performance.

A molten material that is generated by heating the welding portion appears in an interval disposed in the welding portion, thereby, the adjacent split yoke portions are tightly fixed. As a result, by the welding portion and the abutting portion which are tightly fixed, the split yoke portions are not moved relatively with each other, and it is possible to maintain the circularity of the stator, for example, even when the split yoke portion is insert-molded with a resin.

In this manner, it is possible to provide the electric motor that is capable of exhibiting the desired motor performance, without lowering the circularity of the stator by the bonding of the split stators.

Another feature of the electric motor according to the aspect of this disclosure resides in that the stator is disposed in a region surrounding an outer circumference of the rotor, and the welding portion is positioned on an outside in the radial direction of the yoke portion.

If the welding portion is positioned on the outside in the radial direction of the yoke portion as this configuration, since a welding jig is easy to be disposed so as not to interfere with the stator, it is possible to enhance working efficiency.

Another feature of the electric motor according to the aspect of this disclosure resides in that one welding portion of the adjacent split yoke portions is configured by a first protruding portion which protrudes in the radial direction with respect to a virtual annular surface having the rotation axis of the yoke portion as a center, and the other welding portion of the adjacent split yoke portions is configured by a second protruding portion which protrudes in the radial direction with respect to the virtual annular surface, and faces the first protruding portion.

As this configuration, if the welding portion is configured to protrude in the radial direction of the yoke portion, a flow of a magnetic flux flowing in the circumferential direction of the yoke portion is not hindered by the welding portion. That is, since the magnetic flux smoothly flows to the adjacent split yoke portions, it is possible to further enhance the motor performance.

Another feature of the electric motor according to the aspect of this disclosure resides in that one welding portion of the adjacent split yoke portions is configured by a curved projection portion which protrudes into a curved shape toward the other welding portion of the adjacent split yoke portions, and the other welding portion is configured by a curved recess portion which faces the curved projection portion, and is hollowed into a curved shape.

If the welding portion is configured into the curved shape as this configuration, since it is possible to sufficiently secure a flow path length of the molten material by the welding, eliminated are damages that the molten material flows to the abutting portion, and the distortion due to thermal stress occurs. Accordingly, the abutting portion is less likely to be influenced by the thermal stress, and it is possible to reliably secure the circularity of the stator which faces the rotor.

Another feature of the electric motor according to the aspect of this disclosure resides in that one welding portion of the adjacent split yoke portions is configured by a curved projection portion which does not protrude further toward the outside in the radial direction than the virtual annular surface having the rotation axis of the yoke portion as a center, and protrudes toward the other welding portion of the adjacent split yoke portions, and the other welding portion is configured by a curved recess portion which faces the curved projection portion, and is hollowed into a curved shape.

Another feature of the electric motor according to the aspect of this disclosure resides in that a groove portion which is hollowed toward the rotor side at a center along the circumferential direction is formed in each split yoke portion, and the groove portion is configured such that protrusions of a pressing member that presses the stator against the rotor are engaged thereto.

In this configuration, since it is possible to weld the split yoke portion in a state where the stator is pressed against the rotor side by the pressing member, position shift of the split yoke portion is not performed in a direction of being separated from the rotor at the time of welding. At this time, if the groove portion that engages the protrusions of the pressing member is disposed at the center in the circumferential direction of the split yoke portion as this configuration, since the split yoke portion is supported in a well-balanced manner, and it is possible to operate the welding jig without interfering with the pressing member, the working efficiency is enhanced. Accordingly, it is possible to reliably secure the circularity of the stator which faces the rotor, with a simple configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. An electric motor comprising:
a rotor that has a rotation axis; and
a stator that includes an annular yoke portion having the rotation axis as a center, and a plurality of teeth portions which protrude in a radial direction from the yoke portion, wherein
the stator is configured with split stators including a plurality of split yoke portions which are split in a circumferential direction,
each of the split stators includes an abutting portion on which adjacent split yoke portions abut each other, and a welding portion on an outer circumferential surface of the respective split yoke portions on which the adjacent split yoke portions are welded in a state of being separated from each other, and
the abutting portion extends in a straight line from an inner surface of the respective split yoke portions to the welding portion.

2. The electric motor according to claim 1, wherein the stator is disposed in a region surrounding an outer circumference of the rotor, and
the welding portion is positioned on an outside in the radial direction of the yoke portion.

3. The electric motor according to claim 1, wherein one welding portion of the adjacent split yoke portions is configured by a first protruding portion which protrudes in the radial direction with respect to a virtual annular surface having the rotation axis of the yoke portion as a center, and
the other welding portion of the adjacent split yoke portions is configured by a second protruding portion which protrudes in the radial direction with respect to the virtual annular surface, and faces the first protruding portion.

4. The electric motor according to claim 1, wherein one welding portion of the adjacent split yoke portions is configured by a curved projection portion which protrudes into a curved shape toward the other welding portion of the adjacent split yoke portions, and
the other welding portion is configured by a curved recess portion which faces the curved projection portion, and is hollowed into a curved shape.

5. The electric motor according to claim 1, wherein a groove portion which is hollowed toward a rotor side at a center along the circumferential direction is formed in each split yoke portion, and
the groove portion is configured such that protrusions of a pressing member that presses the stator against the rotor are engaged therewith.

6. An electric motor comprising:
a rotor that has a rotation axis; and
a stator that includes an annular yoke portion having the rotation axis as a center, and a plurality of teeth portions which protrude in a radial direction from the yoke portion,
wherein the stator is configured with split stators including a plurality of split yoke portions which are split in a circumferential direction,
each of the split stators includes an abutting portion on which adjacent split yoke portions abut each other, and a welding portion on an outer circumferential surface of the respective split yoke portions on which the adjacent split yoke portions are welded in a state of being separated from each other,
the abutting portion extends in a straight line from an inner surface of the respective split yoke portions to the welding portion,
one welding portion of the adjacent split yoke portions is configured by a curved projection portion which does not protrude further toward an outside in the radial direction than a virtual annular surface having the rotation axis of the yoke portion as a center, and protrudes toward the other welding portion of the adjacent split yoke portions, and
the other welding portion is configured by a curved recess portion which faces the curved projection portion, and is hollowed into a curved shape.

7. The electric motor according to claim 6, wherein a groove portion which is hollowed toward a rotor side at a center along the circumferential direction is formed in each split yoke portion, and the groove portion is configured such that protrusions of a pressing member that presses the stator against the rotor are engaged therewith.

* * * * *